(12) United States Patent
Hovis et al.

(10) Patent No.: US 8,628,023 B2
(45) Date of Patent: Jan. 14, 2014

(54) AUGMENTED BINARY CODE SYMBOL

(75) Inventors: Gregory Hovis, Martinez, GA (US);
William Ranson, Columbia, SC (US);
Reginald Vachon, Atlanta, GA (US)

(73) Assignee: Direct Measurements, Inc., Atlanta, GA (US)

( * ) Notice: Subject to any disclaimer, the term of this patent is extended or adjusted under 35 U.S.C. 154(b) by 764 days.

(21) Appl. No.: 12/311,053

(22) PCT Filed: Aug. 16, 2007

(86) PCT No.: PCT/US2007/018177
§ 371 (c)(1),
(2), (4) Date: Aug. 26, 2009

(87) PCT Pub. No.: WO2008/021452
PCT Pub. Date: Feb. 21, 2008

(65) Prior Publication Data
US 2010/0072288 A1  Mar. 25, 2010

Related U.S. Application Data

(63) Continuation of application No. 12/311,054, filed as application No. PCT/US2007/018185 on Aug. 16, 2007, now abandoned.

(60) Provisional application No. 60/838,151, filed on Aug. 17, 2006, provisional application No. 60/838,152, filed on Aug. 17, 2006, provisional application No. 60/838,153, filed on Aug. 17, 2006, provisional application No. 60/838,155, filed on Aug. 17, 2006, provisional application No. 60/838,201, filed on Aug. 17, 2006.

(51) Int. Cl.
*G06K 19/06* (2006.01)

(52) U.S. Cl.
USPC ...... 235/494; 235/460; 235/487; 235/262.25; 235/462.01; 235/462.11; 235/456

(58) Field of Classification Search
USPC .......................................... 235/494
See application file for complete search history.

(56) References Cited

U.S. PATENT DOCUMENTS 5,726,435 A  3/1998  Hara et al.
5,777,309 A  7/1998  Maltsev et al.
(Continued)

FOREIGN PATENT DOCUMENTS

WO    2005/125020 A1    12/2005

*Primary Examiner* — Steven S Paik
*Assistant Examiner* — Tae Kim
(74) *Attorney, Agent, or Firm* — Westerman, Hattori, Daniels & Adrian, LLP

(57) ABSTRACT

An augmented binary code symbol (100) includes a perimeter, first and second data regions (20) along adjacent sides of the perimeter, first and second utility regions (30) along adjacent sides of the perimeter opposite the first and second data regions (20), first and second finder cells (40) at opposite corners of the rectangle, and inner and outer quiet regions distinguishing the first and second data regions, the first and second utility regions (30), and the first and second finder cells (40) from their background. Each data region and each utility region has at least one row (22) of a plurality of data cells (24) and utility cells, respectively, which encode data and have well-defined edges, enabling the number of data and utility cells to be increased, so as to increase the density of the encoded data. The data and utility cells are marked using a short wave length laser in order to create the well-defined edges.

12 Claims, 1 Drawing Sheet

(56) References Cited

U.S. PATENT DOCUMENTS

| | | |
|---|---|---|
| 5,811,776 A | 9/1998 | Liu |
| 5,862,267 A | 1/1999 | Liu |
| 6,267,296 B1 * | 7/2001 | Ooshima et al. ............... 235/487 |
| 6,802,450 B2 * | 10/2004 | Cheung et al. ............ 235/462.25 |
| 6,863,218 B2 * | 3/2005 | Muramatsu ............... 235/462.25 |
| 6,866,199 B1 | 3/2005 | Keech et al. |
| 6,874,370 B1 | 4/2005 | Vachon |
| 6,934,013 B2 | 8/2005 | Vachon et al. |
| 7,533,818 B2 * | 5/2009 | Hovis et al. ............... 235/462.09 |
| 2004/0036853 A1 * | 2/2004 | Vachon et al. .................. 356/32 |
| 2006/0131417 A1 * | 6/2006 | Kucher et al. ............ 235/462.01 |
| 2006/0173638 A1 | 8/2006 | Hovis et al. |

\* cited by examiner

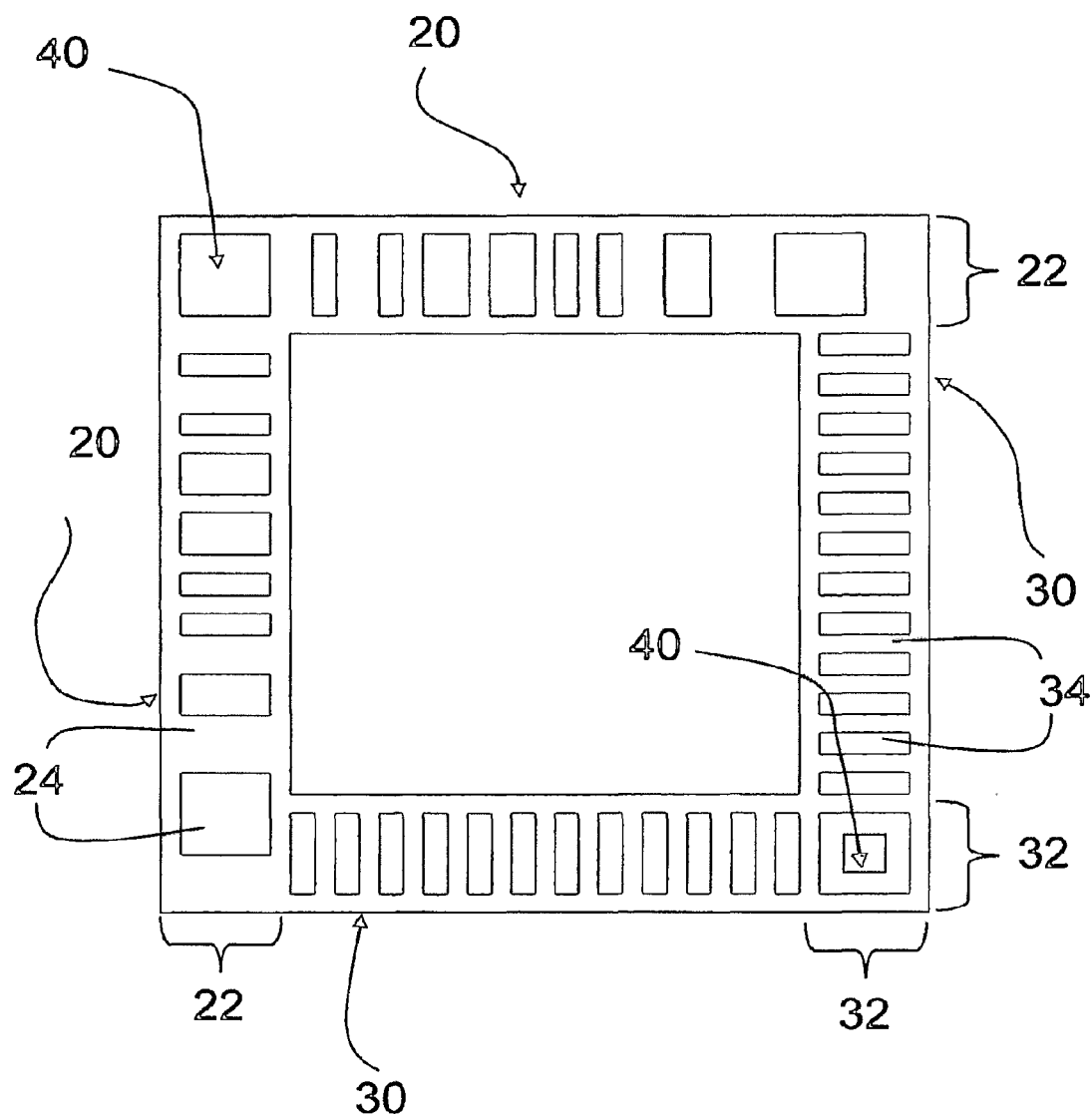

AUGMENTED BINARY CODE SYMBOL

CROSS-REFERENCE TO RELATED APPLICATIONS

The present patent application a continuation of U.S. application Ser. No. 12/311,054, filed Aug. 26, 2009, which is a nationalization of International application No. PCT/US2007/018185, filed Aug. 16, 2007, published in English, which is based on, and claims priority from, U.S. provisional Application No. 60/838,151, 60/838,152, 60/838,153, 60/838,155, and 60/838,201, all filed Aug. 17, 2006, which are incorporated herein by reference in their entireties.

BACKGROUND OF THE INVENTION

1. Field of the Invention

The present invention relates to a binary code symbol for non-linear strain measurement. More specifically, the invention relates to an augmented binary code symbol for non-linear strain measurement that constitutes an improvement over the binary code symbol that is the subject of co-pending U.S. patent application Ser. No. 11/167,558, filed Jun. 28, 2005.

2. Related Art

Co-pending U.S. Published Application No. 2006-0289652-A1 (Application Ser. No. 11/167,558, filed Jun. 28, 2005), the disclosure of which is incorporated herein by reference in its entirety, is directed to a rectangular binary code symbol for non-linear strain measurement comprising a solid, continuous perimeter, first and second data regions along adjacent sides of the perimeter, first and second utility regions along adjacent sides of the perimeter opposite the first and second data regions, first and second finder cells at opposite corners of the rectangle, and inner and outer quiet regions distinguishing the first and second data regions, the first and second utility regions, and the first and second finder cells from their background. Each data region comprises a number of data cells, each data cell representing a single bit of binary data; and each utility region comprises a number of utility cells of alternating appearance.

The binary code symbol disclosed in U.S. Published Application No. 2006-0289652-A1 has a number of advantages, including that it has a unique geometry and attributes; it provides a binary code symbol for non-linear strain measurement having features that enhance deformation and strain measurement; it provides a binary code symbol for non-linear strain measurement that is designed specifically for perimeter-based deformation and strain analysis; it provides a perimeter strain analysis method for use with a binary code symbol for non-linear strain measurement; it provides a binary code symbol for non-linear strain measurement with near-perimeter data encoding; and it provides a binary code symbol for non-linear strain measurement that can encode a range of data values using an error-correcting code ("ECC") technique.

However, the amount of data that can be encoded into the binary code symbol is limited by the space available in the perimeter of the binary code symbol.

It is to the solution of this and other problems that the present invention is directed.

SUMMARY OF THE INVENTION

It is accordingly a primary object of the present invention to provide an augmented binary code symbol that provides additional data, such as encoded data that can be termed a "license plate" (because the encoded data can be used to identify a symbol being used to measure strain, much as a license plate can be used to identify a vehicle), and/or strain readings.

It is another object of the present invention to provide an augmented binary code symbol for non-linear strain measurement having a unique geometry and attributes.

It is still another object of the present invention to provide an augmented binary code symbol for non-linear strain measurement having features that enhance deformation and strain measurement.

It is still another object of the present invention to provide an augmented binary code symbol for non-linear strain measurement that is designed specifically for perimeter-based deformation and strain analysis.

It is still another object of the present invention to provide an augmented binary code symbol for non-linear strain measurement with near-perimeter data encoding.

It is another object of the present invention to provide an augmented binary code symbol for non-linear strain measurement that can encode a range of data values using an error-correcting code ("ECC") technique.

These and other objects of the invention are achieved by the provision of a binary code symbol of the type disclosed in U.S. Published Application No. 2006-0289652-A1, augmented to increase the amount of stored data. The augmented binary code symbol has a solid, continuous perimeter, first and second data regions along adjacent sides of the perimeter, first and second utility regions along adjacent sides of the perimeter opposite the first and second data regions, first and second finder cells at opposite corners of the rectangle, and inner and outer quiet regions distinguishing the first and second data regions, the first and second utility regions, and the first and second finder cells from their background; wherein each data region comprises a row of data cells, each data cell representing a single bit of binary data; and each utility region comprises two rows of utility cells of alternating appearance.

The augmented binary code symbol in accordance with the present invention increases the amount of stored data relative to the binary code symbol of the type disclosed in U.S. Published Application No. 2006-0289652-A1, by encoding data, as well as utility information, in the first and second utility regions to augment the encoding in the data regions. In addition, the number of cells in the first and second utility regions is increased by increasing the number of cells per row, permitting additional utility values to be encoded in the first and second utility regions.

The augmented binary code symbol in accordance with the present invention provides inherent redundancy of the stored data, for example, the license plate number. A computer program can be used to recreate stored data (for example, a license plate number), even when some of the augmented binary code symbol is destroyed.

Further, the stored data (for example, a unique license plate number) can be linked to a data base in a straight forward manner. The number of the license plate is used to match a number in a data base, and once the number is found, the data base information is displayed. In addition, once the data base information is displayed, other entries may be added to or deleted from the data base.

The binary code symbol in accordance with the present invention permits the use of the same theory, algorithms, and computer programs as described in U.S. Published Application No. 2006-0289652-A1.

A non-linear strain gage in accordance with the invention comprises a target associated with an object for which at least one of strain and fatigue damage is to be measured, sensor means for pre-processing the detectable physical quantity emitted by the target and output data representing the physical quantity, the sensor means being compatible with the detectable physical quantity, means for analyzing the data output by the sensor means to define the augmented binary code symbol, and means for measuring the strain on the object directly based on the pre-processed and analyzed data, wherein the target comprises the augmented binary code symbol in accordance with the present invention.

In another aspect of the invention, the non-linear strain gage further comprises means for utilizing the strain measurement to provide information on at least one of fatigue damage and strain hysteresis for materials of known and unknown mechanical properties.

In a method of measuring strain on an object directly, in accordance with the present invention, the augmented binary code symbol is associated with an object in such a way that deformation of the nested binary code symbols and deformation under load of the object bear a one-to-one relationship, wherein the augmented binary code symbol emits a detectable physical quantity. The changes in the augmented binary code symbol are identified as a function of time and change in the load applied to the object. The changes in the augmented binary code symbol are then converted into a direct measurement of strain.

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1 illustrates a generic layout of an augmented binary code symbol in accordance with the present invention.

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

An augmented binary code symbol 100 for non-linear strain measurement in accordance with the present invention is designed specifically for perimeter-based deformation and strain analysis, while providing for robust, self-checking/self-correcting data encoding. Specific geometric features of the symbol 100 are optimized for perimeter-based, non-linear strain measurement using discrete or analog deformation analysis methods.

FIG. 1 is an illustration of a generic, augmented, binary code symbol 100 in accordance with the present invention. The augmented binary code symbol 100 is a symbol of the type disclosed in U.S. Published Application No. 2006-0289652-A1, augmented to increase the number of data cells 24 or a multi-format binary code symbol as disclosed in our co-pending U.S. provisional application No. 60/838,152, filed Aug. 17, 2006, entitled "Multi-Format, Binary Code Symbol For Non-Linear Strain Measurement". Using the same symbol layout as disclosed in U.S. Published Application No. 2006-0289652-A1, the high density, binary code symbol 100 in accordance with the present invention retains its primary features: i.e., two data regions 20, two utility regions 30, and two finder cells 40 40.

The augmented binary code symbol 100 in accordance with the present invention increases the amount of stored data relative to the binary code symbol of the type disclosed in U.S. Published Application No. 2006-0289652-A1, by encoding data, as well as utility information, in the first and second utility regions 30 to augment the encoding in the data regions 20. The data encoded in the utility regions supplements the data encoded into the first and second data regions 20. In addition, the number of cells in the first and second utility regions 30 is increased by increasing the cell density by making the cells smaller, permitting additional utility values to be encoded in the first and second utility regions 30.

In an example in which the augmented binary code symbol 100 is used to store encoded data that can be termed a "license plate" (because the encoded data in the first and second utility regions can be used to uniquely identify an augmented binary code symbol being used to measure strain, much as a license plate can be used to identify a vehicle), each augmented binary code symbol 100 can encode one of up to 4.29 billion possible numbers. An augmented binary code symbol 100 having n1 cells in each data region 20 and n2 cells in each utility region 30 can encode n3 possible permutations of letters and numbers. Two examples are given in the following table:

TABLE 1

| # data cells per data region | # bits encoded with error correction | # unique code combinations |
| --- | --- | --- |
| 28 | 16 | $2^{16}$ = 65,536 |
| 56 | 32 | $2^{32}$ = 4,294,967,296 |

The number n3 of unique code combinations can be made higher if the density or the number of bits encoded is increased.

The rectangular augmented binary code symbol 100 of FIG. 1 is square in shape, with the characteristic solid, continuous outer perimeter 10. In the binary code symbol 100 shown in FIG. 1, the symbol also has a solid, continuous inner perimeter 12, although in general, a solid, continuous inner perimeter 12 is not required.

There are two data regions 20 along adjacent sides of the rectangle. Each data region 20 is made up of at least one row 22, and each row 22 is made up of a number of data cells 24. The symbol 100 in FIG. 1 has fifteen data cells 24 per row 22; however no particular limit is placed on the number of data cells 24 in each data region 20; and there can there be more than one row 22 of data cells 24 in each data region 20. In the case of symbols that are symmetric about a diagonal of the rectangle, the data regions 20 can be mirror images of one another for encoded-data redundancy.

Opposite each data region 20 along a side of the rectangle is a utility region 30. Each utility region 30 is made up of one row 32, and each row 32 is made up of a number of utility cells 34 with alternating appearance (i.e. foreground, background, foreground, etc.) The utility regions 30 assist in symbol location, orientation, and analysis. In addition, data (e.g. license plate number, vendor ID, application ID, function ID, version information, date/time, materials ID/info, etc.) is encoded in the first and second utility regions 30, in the utility cells 34, to augment the encoding in the data regions 20; and the number of cells in the first and second utility regions 30 is increased, permitting additional utility values to be encoded in the first and second utility regions 30. For example, as previously described, the data encoded in the utility cells 34 can uniquely identify the augmented binary code symbol 100 being used to measure strain, much as a license plate can be used to identify a vehicle).

There are no restrictions placed on data cell 24 or utility cell 34 foreground and background appearance except that sufficient contrast is provided to enable a sensor to determine cell state.

There are two distinct finder cells 40 on opposite corners of the rectangle, which can be used to orient the symbol 100. Inner and outer quiet regions are designated whereby the data regions 20, the utility regions 30, and the finder cells 40 can be distinguished from their background.

The binary code symbol 100 in accordance with the present invention doubles the number of data cells 24 in the first and second data regions 20, relative to the binary code symbol of the type disclosed in U.S. Published Application No. 2006-0289652-A1, thereby increasing the number of unique encoded values from 65 thousand to over 4 billion. In addition, the number of cells in the first and second utility regions 30 is also increased, permitting additional utility values to be encoded in the first and second utility regions 30.

The binary code symbol as disclosed in U.S. Published Application No. 2006-0289652-A1 by itself can produce 65,536 license numbers encoding data only in the first and second data regions 20, and based on current data density. In contrast, the augmented binary code symbol 100 shown in FIG. 1 by itself could ultimately produce a total of 4.29 billion license plate numbers by encoding data in the first and second utility regions 30 in addition to the first and second data regions 20. The figure of 4.29 billion is based on refinement of the marking process to change the density of the data. More specifically, the cells must have well defined (not fuzzy) edges, and as the imaging lens magnifies the image and the edges, the selection of the marking process affects the quality of the edges. If a short wave length laser is used for marking, as compared to a long wave laser, the definition and quality for the edge can be refined and smaller cells can be produced. Further refinement of data density could increase the number of license plates beyond the 4.29 billion figure. The encoded data (in this example, the unique license number) can be linked to a data base. The larger the number of license plate numbers the larger the data base.

A key feature of the augmented binary code symbol 100 is the inherent redundancy of the encoded data, due to use of an ECC algorithm that recreates the encoded data if some of the augmented binary code symbol 100 is destroyed. The actual recovery of damaged data happens when the sensor decodes a particular data region 20 using the ECC algorithm.

The ECC algorithm used is a Hamming 7-4 technique. This encoding method takes the original data value (un-encoded) and breaks it into 4-bit "words." Each 4-bit word is encoded into a 7-bit word containing the original value and three "check bits." This method permits the original 4-bit word to be recovered in the event that the sensor can not determine the state of one of the 7-bit word's bits. Therefore, the original data value can be recovered if up to one bit in each word is lost.

Redundancy is not used directly to correct bad data, only the Hamming process does that. However, redundancy is used in the selection of the "right" value.

For symbols that use redundancy, by definition the values in the two data regions 20 must agree. In these symbols, the algorithm decodes (and corrects if need be) each data region 20 independently using the Hamming method above. The algorithm then checks for agreement, and if the value in one region agrees with the value in the other region, it reports that value. If the two data-region values do not agree, the algorithm decides which region holds the "right" value by looking at a record of corrections made when decoding the data regions 20. The "right" value is assumed to be the one taken from the data region 20 with the fewest Hamming corrections. In the less-likely case where the two values do not agree, yet both have the same number of corrections, or both have no corrections, we have a situation where the algorithm cannot offer a definitive value, but can suggest possibilities. This situation can be handled by utilizing the utility data to provide additional information using the Hamming method and correlation of information from the data base.

In a binary code symbol 100 in accordance with the present invention, information is encoded via the symbol's data cells 24 as described in U.S. Published Application No. 2006-0289652-A1. An individual data cell 24 represents a single bit of information; that is, its state is either "on" or "off" (i.e. "1" or "0"). The order and state of individual bit values combine to represent an encoded data value. The binary contribution of a single data cell 24 is indicated by the cell's state, which is determined by a sensor. Data cells 24 that have the same appearance as the symbol's background (or quiet region) are considered "on" or bit value "1." Data cells 24 that have the same appearance as the foreground (or perimeter) are considered "off" or bit value "0." The augmented binary code symbol 100 shown in FIG. 1 contains the unique license plate number 12890.

Since the overall symbol geometry has not changed from that disclosed in U.S. Published Application No. 2006-0289652-A1, and the data cells 24 remain in a contiguous layout across the data regions 20, the theory, algorithms, and computer programs used to scan and decode the symbol 100, as well as measure strain, as disclosed in application Ser. No. 11/167,558, remain essentially the same.

The augmented binary code symbol 100 in accordance with the present invention can be used as the target of a non-linear strain gage for measuring the strain on an object under load, as described in U.S. Published Application No. 2006-0289652-A1. Deformation analysis of the symbol's spatial characteristics and strain measurement can be carried out as disclosed in U.S. Published Application No. 2006-0289652-A1, using a computer to implement the methods, algorithms, and apparatus as disclosed therein.

A non-linear strain gage employing the augmented binary code symbol 100 as a target also uses a computer to implement the same theory, algorithms, and computer programs as described in U.S. Published Application No. 2006-0289652-A1, which (1) identify the binary code symbols 100 and the changes therein as a function of time and change in the load, (2) translate the changes in the binary code symbols 100 into strain, and (3) display it in a suitable format.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. An object for which at least one of strain and fatigue damage is to be measured and having a target associated therewith on a surface thereof or embedded therein, the target incorporating an augmented binary code symbol for non-linear strain measurement and perimeter-based deformation and strain analysis, the augmented binary code symbol emitting a detectable physical quantity and including:

a solid, continuous, rectangular outer perimeter;

first and second data regions along adjacent sides of the outer perimeter, each data region comprising at least one row of a plurality of data cells, each data cell representing a single bit of binary data;

first and second utility regions along adjacent sides of the outer perimeter opposite the first and second data regions, each utility region comprising at least one row of a plurality of utility cells of alternating appearance, wherein the utility cells encode data in the first and second utility regions;

first and second finder cells at opposite corners of the rectangle; and inner and outer quiet regions distinguishing the first and second data regions, the first and second utility regions, and the first and second finder cells from their background;

wherein the data cells and the utility cells have edges that are well-defined to enable reduction of the size of the data cells and preservation of the quality of edges of the data cells of reduced size when an image of the augmented binary code symbol is magnified; and wherein the data encoded in the utility cells identifies the augmented binary code symbol.

2. The object of claim 1, wherein the data cells and the utility cells are marked using a short wave length laser.

3. The object of claim 1, wherein the first and second utility regions assist in symbol location, orientation, and analysis.

4. The object of claim 1, wherein the augmented binary code symbol is symmetric about a diagonal of the rectangular outer perimeter and the first and second data regions are mirror images of one another to provide redundancy of the data encoded therein.

5. An object for which at least one of strain and fatigue damage is to be measured and having a target associated therewith on a surface thereof or embedded therein, the target incorporating an augmented binary code symbol for non-linear strain measurement and perimeter-based deformation and strain analysis, the augmented binary code symbol emitting a detectable physical quantity and including:

a solid, continuous, rectangular outer perimeter;

first and second data regions along adjacent sides of the outer perimeter, each data region comprising at least one row of a plurality of data cells, each data cell representing a single bit of binary data;

first and second utility regions along adjacent sides of the outer perimeter opposite the first and second data regions, each utility region comprising at least one row of a plurality of utility cells of alternating appearance, wherein the utility cells encode data in the first and second utility regions;

first and second finder cells at opposite corners of the rectangle; and inner and outer quiet regions distinguishing the first and second data regions, the first and second utility regions, and the first and second finder cells from their background;

wherein the data cells and the utility cells have edges that are well-defined to enable reduction of the size of the data cells and preservation of the quality of edges of the data cells of reduced size when an image of the augmented binary code symbol is magnified;

wherein data in the first and second data regions of the augmented binary code symbol are encoded by breaking an un-encoded value of the data into 4-bit words, and encoding each of the 4-bit words into a 7-bit word containing the original value and three check bits, using a Hamming 7-4 technique, and wherein the data encoded in the utility regions includes information for resolving disagreement between a decoded value of the data encoded in the first data region and a de-coded value of the data encoded in the second data region.

6. The object of claim 5, wherein the data cells and the utility cells are marked using a short wave length laser.

7. The object of claim 5, wherein the first and second utility regions assist in symbol location, orientation, and analysis.

8. The object of claim 5, wherein the augmented binary code symbol is symmetric about a diagonal of the rectangular outer perimeter and the first and second data regions are mirror images of one another to provide redundancy of the data encoded therein.

9. A non-linear strain gage for measuring the strain on an object, comprising:

a target associated with an object for which at least one of strain and fatigue damage is to be measured, the target incorporating an augmented binary code symbol for non-linear strain measurement and perimeter-based deformation and strain analysis, the augmented binary code symbol emitting a detectable physical quantity and including:

a solid, continuous, rectangular outer perimeter;

first and second data regions along adjacent sides of the outer perimeter, each data region comprising at least one row of a plurality of data cells, each data cell representing a single bit of binary data;

first and second utility regions along adjacent sides of the outer perimeter opposite the first and second data regions, each utility region comprising at least one row of a plurality of utility cells of alternating appearance, wherein the utility cells encode data in the first and second utility regions;

first and second finder cells at opposite corners of the rectangle; and inner and outer quiet regions distinguishing the first and second data regions, the first and second utility regions, and the first and second finder cells from their background;

wherein the data cells and the utility cells have edges that are well-defined to enable reduction of the size of the data cells and preservation of the quality of edges of the data cells of reduced size when an image of the augmented binary code symbol is magnified; and wherein the data encoded in the utility cells identifies the augmented binary code symbol;

sensor means for pre-processing the detectable physical quantity emitted by the target and output data representing the physical quantity, the sensor means being compatible with the detectable physical quantity emitted by the augmented binary code symbol, means for analyzing the data output by the sensor means to define the augmented binary code symbol, and means for measuring the strain on the object directly based on the pre-processed and analyzed data.

10. A method of measuring strain on an object directly using the non-linear strain gage in accordance with claim 9, comprising the steps of:

associating the augmented binary code symbol associated with an object in such a way that deformation of the nested binary code symbols and deformation under load of the object bear a one-to-one relationship;

identifying the changes in the augmented binary code symbol as a function of time and change in the load applied to the object; and converting the changes in the augmented binary code symbol into a direct measurement of strain.

11. A non-linear strain gage for measuring the strain on an object, comprising:

a target associated with an object for which at least one of strain and fatigue damage is to be measured, a target associated therewith on a surface thereof or embedded therein, the target incorporating an augmented binary code symbol for non-linear strain measurement and perimeter-based deformation and strain analysis, the augmented binary code symbol emitting a detectable physical quantity and including:

a solid, continuous, rectangular outer perimeter;

first and second data regions along adjacent sides of the outer perimeter, each data region comprising at least one row of a plurality of data cells, each data cell representing a single bit of binary data;

first and second utility regions along adjacent sides of the outer perimeter opposite the first and second data regions, each utility region comprising at least one row of a plurality of utility cells of alternating appearance, wherein the utility cells encode data in the first and second utility regions;

first and second finder cells at opposite corners of the rectangle; and inner and outer quiet regions distinguishing the first and second data regions, the first and second utility regions, and the first and second finder cells from their background;

wherein the data cells and the utility cells have edges that are well-defined to enable reduction of the size of the data cells and preservation of the quality of edges of the data cells of reduced size when an image of the augmented binary code symbol is magnified;

wherein data in the first and second data regions of the augmented binary code symbol are encoded by breaking an un-encoded value of the data into 4-bit words, and encoding each of the 4-bit words into a 7-bit word containing the original value and three check bits, using a Hamming 7-4 technique, and wherein the data encoded in the utility regions includes information for resolving disagreement between a decoded value of the data encoded in the first data region and a de-coded value of the data encoded in the second data region;

sensor means for pre-processing the detectable physical quantity emitted by the target and output data representing the physical quantity, the sensor means being compatible with the detectable physical quantity emitted by the augmented binary code symbol, means for analyzing the data output by the sensor means to define the augmented binary code symbol, and means for measuring the strain on the object directly based on the pre-processed and analyzed data.

12. A method of measuring strain on an object directly using the non-linear strain gage in accordance with claim 11, comprising the steps of:

associating the augmented binary code symbol associated with an object in such a way that deformation of the nested binary code symbols and deformation under load of the object bear a one-to-one relationship;

identifying the changes in the augmented binary code symbol as a function of time and change in the load applied to the object; and converting the changes in the augmented binary code symbol into a direct measurement of strain.

\* \* \* \* \*